Sept. 10, 1968  A. F. McLEAN  3,400,535
AUTOMOTIVE GAS TURBINE FUEL CONTROL SYSTEM
Filed Oct. 3, 1966
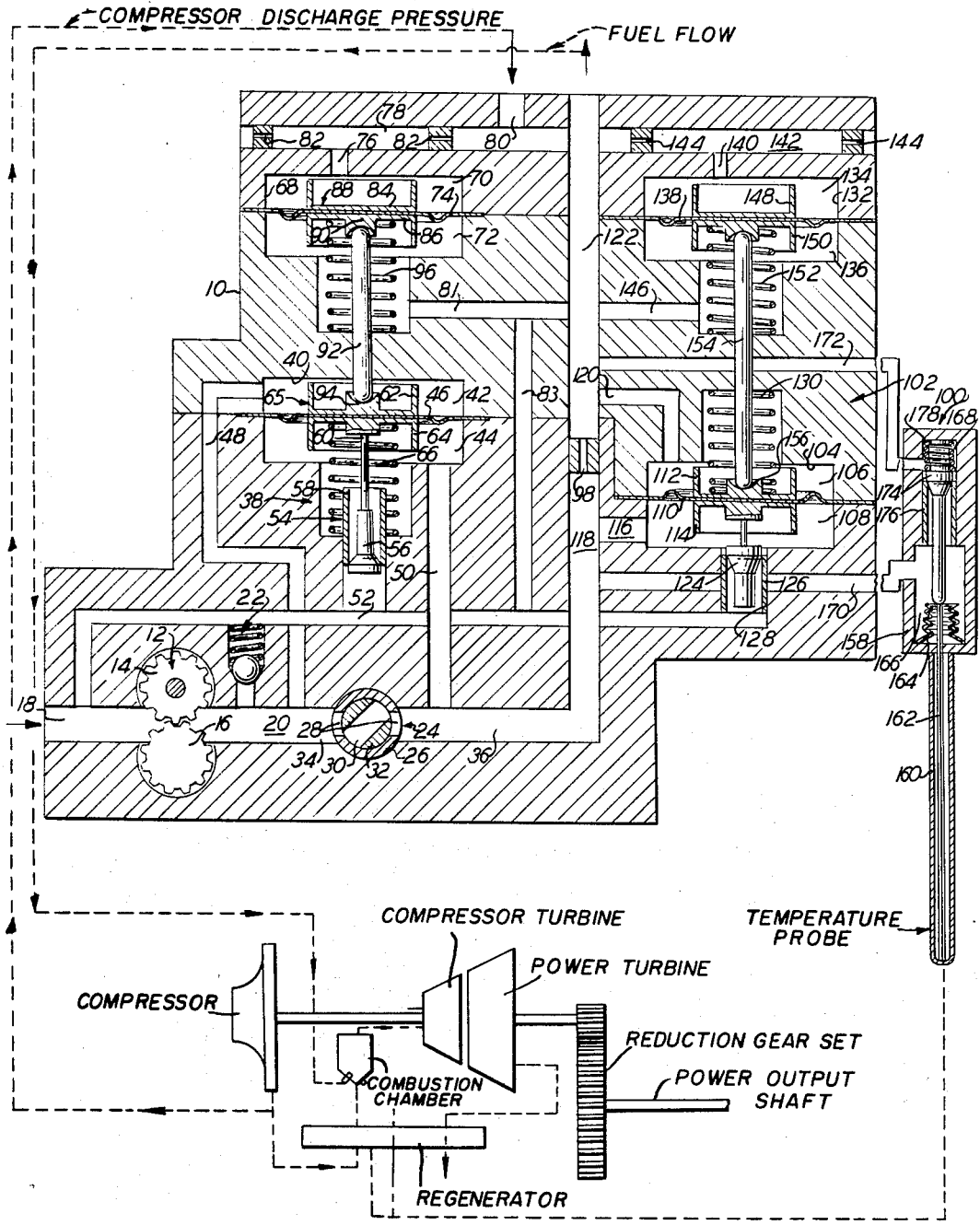
ARTHUR F. McLEAN
INVENTOR.
BY John R. Faulkner
Robert E. McCollum
ATTORNEYS

United States Patent Office 3,400,535
Patented Sept. 10, 1968

3,400,535
AUTOMOTIVE GAS TURBINE FUEL CONTROL SYSTEM
Arthur F. McLean, Livonia, Mich., assignor to Ford Motor Company, Dearborn, Mich., a corporation of Delaware
Filed Oct. 3, 1966, Ser. No. 583,534
10 Claims. (Cl. 60—39.28)

ABSTRACT OF THE DISCLOSURE

A fuel control system having a throttle valve controlling fuel flow, a first steady state pressure regulating valve for maintaining the pressure differential across the throttle valve constant for a set position of the valve, modified by compressor discharge pressure above a predetermined level; an acceleration fuel flow control including a fixed area flow orifice and an variable area bypass, a second pressure regulating valve modifying the flow through the orifice as a function of either the pressure differential across the orifice or changes in compressor discharge pressure, and a temperature responsive control to modify flow through the bypass as a function of engine temperature change above a set value.

---

This invention relates, in general, to a fuel control system. More particularly, it relates to a fuel control system for a gas turbine engine installed in a motor vehicle.

A primary object of the invention is to provide a fuel control system that will correctly meter fuel to a gas turbine engine for all conditions of operation; i.e., starting, accelerations, decelerations, and steady running conditions of operation.

Another object of the invention is to provide a gas turbine fuel control system that is relatively simple in construction and economical to manufacture.

A further object of the invention is to provide a gas turbine fuel control system with pressure and flow modulating devices to maintain operation of the engine within a safe range.

A still further object of the invention is to provide a gas turbine engine fuel control system that; first, meters fuel from a pump through an orifice, a throttle member having fuel regulating means associated with it to maintain either a constant pressure drop across the orifice or, alternately, a pressure drop that is modulated as a function of the changes in compressor discharge fluid pressure; and secondly, further controls the fuel flow by a second flow restricter having a fuel flow regulating apparatus that modulates the flow as a function of the increases in compressor discharge pressure and/or the rise in temperature of an operating portion of the engine.

Other objects, features and advantages of the invention will become apparent upon reference to the succeeding, detailed description thereof, and to the drawing wherein there is illustrated, schematically, a gas turbine engine and a cross-sectional view of a fuel control system embodying the invention.

The upper portion of the figure shows a valve body containing a plurality of movable flow control means for scheduling the fuel from a tank or reservoir (not shown) to the engine combustion chamber illustrated schematically in the lower portion of the figure. In this particular instance, the fuel control system is preferably for use with a gas turbine engine that is to be installed in a motor vehicle for driving the same. It should be noted, however, that it would be useful in many other installations where it is desired to control the gas turbine fuel flow in the manner to be described.

The details of construction and operation of the gas turbine engine are not shown or described, since they are known and are believed to be unnecessary for an understanding of the invention. Suffice it to say that the engine, as indicated in the figure, contains the usual compressor delivering air under pressure through a diffuser (not shown) into and through a rotary heat exchanger; whereupon, the heated air passes into the combustion chamber where it is combined with fuel from the control shown in the upper portion of the figure; the products of combustion rotating a first turbine fixed to the compressor, and a free power turbine connected by gearing to a power output shaft; the hot exhaust gases from the power turbine being directed to the heat exchanger.

In automotive installations, as illustrated, it is common to use regenerators between the outlet of the compressor and the inlet to the combustion chamber or burner cans to recoup some of the normally wasted energy of the hot turbine exhaust gases and thereby provide better fuel economy. Since the regenerator outlet temperature and compressor discharge pressure both vary as functions of the change in fuel flow to the combustion chambers, they serve as good signals to indicate the condition of operation of the engine. Accordingly, the control system of the invention utilizes both of these variables to modulate the fuel pressure drop and quantity of flow to the engine, to maintain operation within a safe range.

More specifically, the figure shows a valve body 10 containing a constant displacement gear-type fuel pump 12 having driving and driven gears 14 and 16. The pump is connected to a fuel reservoir or tank (not shown) by a low pressure fuel inlet line 18, and discharges fuel under pressure through a line 20. The output fuel flow varies linearly with pump speed and the pump would be driven in a suitable manner by, say, the engine compressor driven accessory driveshaft through appropriate gearing, not shown. The low and high pressure lines 18 and 20 are interconnected in the usual manner by a bypass-type pressure relief valve 22 to prevent damage to the system in the event of over pressurization for any reason.

Fuel flow through discharge line 20 is controlled initially by a rotatable throttle valve 24. The valve includes an outer stationary sleeve 26 having diametrically opposed openings 28. The openings cooperate with a passage 30 through a rotary shaft 32 to meter fuel flow through line 20 as a function of the position of the valve. In this case, shaft 32 would be connected by suitable linkage (not shown) to the vehicle accelerator pedal so as to be movable against a spring bias (not shown) from a minimum open position to a position fully aligning passage 30 with openings 28, depending upon the demand for fuel flow by the vehicle operator. The throttle valve thus constitutes a variable area orificing means. The minimum opening of the valve would, of course, be sized to provide the desired engine idle speed operation.

As is evident, the flow through throttle valve 24 provides a pressure drop between the upstream and downstream portions 34 and 36 of discharge line 20. A regulating means 38 is included to maintain a constant pressure drop for each set position of valve 24 and thereby govern the engine to a set speed according to throttle valve position. Valve body 10 is formed with a fluid chamber 40 that is partitioned into two variable area portions 42 and 44 by a flexible diaphragm 46 sealingly fixed to the chamber walls. Chamber 42 is connected by a line 48 directly to the high pressure output of pump 12. Chamber 44 in turn is connected by a line 50 to the downstream side of throttle valve member 24, and also by a line 52 to the low pressure inlet side of pump 12.

Flow between chamber 44 and line 52 is controlled by an excess fuel drain valve assembly 54. This assembly includes a poppet-type valve 56 reciprocatable in a sleeve 58 that is sealingly inserted in the bore connecting chamber 44 and drain line 52. The valve has a stem 60 connected to a pair of back-to-back channel-shaped annular force transmitting members 62 and 64 that are fixed to and straddle diaphragm 46. The channel-shaped members, together with valve stem 60, thus, in effect, constitute a piston-like actuating member or means 65 for regulating the pressure drop across throttle valve 24. Drain valve 56 is normally maintained in a seated or closed condition, as shown, by a spring 66 seated between one end of chamber 44 and channel member 64.

It will be clear that when the forces of spring 66 and the fuel pressure in line 50 balance the pump output pressure in chamber 42, a constant pressure differential will exist across throttle member 24 for any one set opening of the valve. If the pressure differential should become greater than desired, as will occur with increases in speed of pump 12, valve 56 will be moved downwardly by the higher pressure in chamber 42 to drain fuel back to the inlet of the pump until the engine speed and, therefore, pump speed drops to a valve providing the pressure drop necessary to close the valve.

The above-described control 38 permits the engine speed to increase to the value dictated by the throttle valve setting. However, there are conditions of operation when this ultimate speed is too high for safe engine operation. For example, when the pump parts become worn, the flow losses become greater, and the pump must be rotated faster to provide the same output for the same throttle setting as before. This requires faster engine operation with faster compressor and turbine speeds and higher regenerator outlet temperatures to a point where more energy is developed than is desirable for safe operation. Accordingly, the fuel flow should be controlled to limit the speed increase. One method of controlling this is to limit the maximum flow by the use of compressor discharge pressure, which increases linearly with speed in a manner similar to the change in the output of the fuel pump.

Another condition of operation wherein the speed becomes unnecessarily high, occurs due to changes in engine operation with changes in inlet air ambient temperature. It is known that changes in the ambient temperature of the air taken into the compressor of the gas turbine engine provides a change in the total output horsepower of the engine. That is, if the engine normally is designed for, say a 50° day to provide an output of, say, 200 horsepower, when the ambient temperature drop to, say, 0° F., the output horsepower increases to, say, 280, since the output varies directly as a function of engine speed and inversely with the square root of the inlet temperature. If the engine were to operate at this higher maximum horsepower output level, the higher temperatures and pressures and overall energy available might very well cause a failure of the engine parts. Again, a control should be provided to prevent such an operation.

Since both horsepower output and compressor discharge pressure vary essentially linearly with changes in ambient temperature conditions, compressor discharge pressure again can be used as a limiting signal force to maintain the fuel flow within a safe operating range regardless of the ambient temperature changes of the engine.

More specifically, the increases in compressor discharge pressure are used to modulate the pressure differential across throttle member 24 so that the fuel flow will not exceed that providing safe engine operation.

As shown in the figure, the upper left-hand portion of valve body 10 contains a second chamber 68 partitioned into two variable area portions 70 and 72 by a flexible annular diaphragm member 74 sealingly fixed to the chamber walls, as shown. Chamber portion 70 is connected by suitable intersecting passages 76 and 78 to line 80 containing compressor discharge air. The line is connected directly to the engine compressor discharge outlet. A pair of suitably sized orifices 82 are provided to eliminate fluctuations and permit necessary adjustments. Chamber 72, on the other hand, is connected by intersecting lines 81 and 83 to the pump low pressure branch inlet line 52.

Diaphragm 74 is straddled by and fixed to a pair of back-to-back annular channel members 84 and 86 constituting a force transmitting piston-like member or means 88. The underside of piston 88 is provided with a seat 90 abuttable by a stem actuator 92 that at its other end abuttingly engages a similar seat 94 formed in piston-like member 65. A spring 96 suitably preloads diaphragm 74 against the compressor discharge fluid pressure in chamber 70 so that low compressor discharge pressures contribute no opening movement forces to poppet valve 56.

It will be evident that as compressor discharge fluid pressure increases beyond predetermined levels, varying with the throttle valve setting, a slowly increasing modulating force will be exerted on piston palve assembly 38 to move drain valve 56 away from its seat. This changes the pressure differential acting on valve 65, and, therefore results in a reduction in the fuel flow for a given throttle valve setting, as compared to control of the flow by the valve assembly 38 alone.

Fuel flow is further controlled by a fixed area orifice 98, in line portion 36, and a variable area orifice assembly 100, in parallel with orifice 98. The scheduling of fuel flow through orifice 98 is controlled by a second pressure drop regulating drain valve apparatus 102 that is similar in construction and operation to drain valve apparatus 38. Valve body 10 is formed with a second fuel chamber 104 partitioned into the portions 106 and 108 by an annular flexible diaphragm 110. The diaphragm is straddled by and fixed to two annular force transmitting, back-to-back, piston-like channel members 112 and 114. Chamber 108 is connected by a line 116 to discharge line portion 118 upstream of orifice 86, while chamber 106 is connected by a line 120 to the discharge line portion 122 downstream of orifice 98.

Channel member 114 is fixed to a poppet-type valve 124, as shown, that is reciprocatingly movable with diaphragm 110 against or away from a seat formed by the open end of a sleeve 126. The sleeve is positioned in a bore 128 connecting chamber 108 with the pump low pressure inlet line 52. A spring 130, having a suitably chosen preload, normally biases diaphragm 110 and valve 124 towards the positions shown, to seat the valve and close off drain of fuel from chamber 108.

It will be clear that insofar as apparatus 102 per se is concerned, it will reciprocate poppet valve 124 until sufficient fuel has drained from chamber 108 to maintain an equilibrium position of the valve providing a predetermined pressure drop and flow across orifice 98.

As stated previously, the flow through orifice 98 is modulated by the changes in compressor discharge fluid pressure to increase the pressure differential and permit more flow as the compressor dicharge pressure increases. The flow, however, is also controlled by the variable area temperature sensitive probe apparatus 100 that is sensitive to regenerator outlet temperature, for example, so as to decrease engine fuel flow when the regenerator outlet temperature surpasses a predetermined value.

More specifically, valve body 10 contains an upper chamber 132 divided into two portions 134 and 136 by an annular flexible diaphragm 138. Chamber 134 contains compressor pressure discharge fluid pressure supplied through connecting bores 140 and 142 from line 80, a pair of suitably sized bleeds 144 providing adjustment. Chamber 136 is connected by a line 146 to the branch pump low pressure inlet line 83. Diaphragm 138 again is straddled by two annular piston-like, channel-shaped force transmitting members 148 and 150, and is biased upwardly by a spring 152. The lower channel member 150 abuttingly bears against a stem or force transmitting member 154 abuttable at its opposite end against a suitably formed surface or projection 156 extending from diaphragm channel portion 112.

From the above, it will be clear that as compressor discharge pressure increases above the preload of spring 152 and the other forces acting on diaphragm 138, a pressure drop modulfating force will be exerted on the drain valve piston portion 112 to urge the poppet valve 124 towards a seated position to lessen communication between chamber 108 and the pump low pressure inlet line 52. Therefore, as compressor discharge pressure increases, the pressure differential across orifice 98 increases, resulting in a greater fuel flow to the engine combustion chambers, and permitting the engine to speed up to provide the necessary acceleration power.

The temperature control of the fuel flow, provided by temperature sensitive probe 100, consists of a hollow casing 158 having a hollow bimetallic, thermally sensitive probe 160 containing a rod 162. Rod 162 at its upper end is fixed to the end of a bellows or diaphragm 164. Probe 160 has a smaller coefficient of expansion than rod 162, which causes lengthening of the rod relative to the probe upon an increase in temperature sensed by both members. In this particular instance, the probe would be inserted in the outlet portion of the regenerator so as to be sensitive to temperature increases of the combustion chamber inlet air.

Casing 158 contains two different diameter bores providing two spaced chambers 166 and 168. Chamber 166 is connected to the upstream portion 118 of discharge line 20 by a branch line 170, while chamber 168 is connected by a branch line 172 to the downstream fuel discharge portion 90 in parallel with the valve assembly 102. The two chambers are separated by a poppet valve 174 slidably movable in to the end of a sleeve 176 in a manner to provide a variable area orifice between the two chambers. A spring 178 biases the poppet valve 174 towards a seated position to reduce the flow past the valve.

The stem of valve 174 during all normal operating conditions is engaged by the upper end of rod 162 with a force that defines a desired orifice size between the two chambers 166 and 168 and permits a scheduled fuel flow from line portion 118 to 120 bypassing orifice 98. Spring 178 would have a low load force, merely sufficient to keep the valve from hunting.

Assume now that the regenerator outlet temperature increasees beyond a desired level, that is, to a point where probe 160 lengthens and rod 142 is permitted to move downwardly under the force of spring 168. This decreases the bypass opening between sleeve 176 and valve 174 and therefore decreases the flow to the engine. This apparatus, therefore, provides a safety check against excessive supply of fuel to a hot engine.

It can be seen from the above that for accelerations, flow to the engine is controlled essentially by two orifices, one being the fixed area orifice 98, the other being the variable area orifice of probe 100.

The operation of the fuel control system for starts, accelerations, decelerations and normal running conditions is believed to be clear from the above description and a consideration of the drawing, and therefore is not given in detail. Suffice it to say that when the engine is started and the throttle valve member 24 opened to, say, a part way position, the pressure differential across throttle valve member 24 and diaphragm 46 will initially be a minimum since the speed and output pressure of pump 12 is low. Also, the low compressor discharge fluid pressure at this time will not be sufficient to overcome the preload of spring 96, which permits spring 66 to seat poppet valve 56. Thus, no fuel is bypassed and all the fuel flows into discharge line portion 36.

The pressure differential across orifice 98 will also be low, permitting spring 130 to maintain valve 124 seated. With a cold engine, temperature control 100 will be ineffective, and the scheduled orificed opening area of valve 174 will be a maximum. Thus, all the fuel will flow through both orifice 98 and past valve 174 into the combustion chamber fuel inlet line 122.

The subsequent increase in engine and compressor speeds and thereby the pump speed, increases the flow as well as the pressure differential across throttle valve 24 and orifice 98. This will continue until one of two things happens. The pump output will remain at maximum until the engine speed set by the position of the throttle valve is reached, at which point the pressure differential between chambers 42 and 44 will have increased to a value where valve 56 will open. This will dump fuel from line portion 36, which will decrease the flow to the engine and thereby result in a drop in engine and pump speeds until the correct pressure differential across throttle valve 24 is maintained. The flow will then continue at the constant rate determined by the setting of the throttle valve.

Alternatively, if the increased pump speed and flow has not as yet provided the maximum pressure differential level set by drain valve assembly 38, but the compressor discharge pressure has increased beyond a safe engine operation point, the increased pressure in chamber 70 will move valve assembly 38 to open valve 56 and drain fuel to the inlet of pump 12. This will modulate the pressure differential and fuel flow so that it stays within the desired range.

Considering now the right hand or engine accelerating portion of the control shown in the figure, the flow through orifice 98 will increase (with increase in pump speed) to a point where the pressure differential across diaphragm 110 will begin to unseat valve 124. Simultaneously, however, the increase in compressor discharge pressure in chamber 134 will urge the valve 124 closed, so as to maintain the fuel flow through line portion 122 sufficient to accelerate the engine in the desired manner. Of course, a point will be reached when the pressure differential across orifice 98 will be sufficient to cause valve 124 to open against the increased compressor discharge pressure, which then cuts down the fuel flow and results in a holding of the engine at the speed reached.

The above, of course, assumes the regenerator outlet temperature stays below the desired predetermined maximum level. If for any reason the temperature should reach the maximum, by this time the probe 160 will have progressively elongated relative to rod 162 sufficiently to have caused spring 178 to move valve 174 progressively downwardly to progressively decrease the opening between chambers 168 and 166. This then decreases the fuel flow to line 122, resulting in a drop in engine and pump speed.

Insofar as decelerations are concerned, the closing movement of throttle valve 24 will immediately decrease the flow and pressure differential between chambers 42 and 44, and with or without, as the case may be, high compressor discharge pressure in effect acting on valve 56 the higher pressure in chamber 44, will open the valve 56. This will drain fuel line portion 122 and chamber 44 and permit valve assembly 38 to regulate the engine and pump speed to the level set by the new position of throttle valve 24.

From the foregoing, therefore, it will be seen that the invention provides a relatively simple fuel metering control system that is economical to manufacture, and one that provides correct metering of fuel to the gas turbine engine for starts, accelerations, decelerations and normal running conditions of the engine, as a function of the throttle setting, and the pressure differential controls as modulated by the changes in compressor discharge pressure and regenerator outlet temperature.

While the invention has been illustrated in its preferred embodiment in the drawing, it will be clear to those skilled in the arts to which the invention pertains that many changes and modifications may be made thereto without departing from the scope of the invention.

I claim:
1. A fuel control system for a gas turbine engine com- prising, and engine driven speed responsive fuel pump having a low pressure fuel inlet line and a high pressure fuel discharge line, the latter line containing fuel varying in pressure as a function of the speed of said pump, a variable area flow restricting engine throttle valve in said discharge line variably movable between flow restricting and non-restricting positions for controlling the flow through said discharge line, governor means associated with said pump and lines for maintaining a predetermined pressure drop of the fuel in said discharge line across said throttle valve varying as a function of the change in position of said throttle valve, said governor means including, a conduit means connecting the portion of said discharge line downstream of said valve to said inlet line, and a spring closed differential pressure operated drain valve means in said conduit means movable between conduit means opening and closed positions and operably acted upon in opposite directions by fuel under pressure from portions of said discharge line on opposite sides of said throttle valve for movement to its various positions, said downstream portion of said discharge line also containing a flow restricting orifice, control means associated with said orifice and lines for controlling the fuel pressure drop across said orifice, said control means including, other conduit means connecting said inlet line to a portion of the discharge line upstream of said orifice, and a second spring closed differential pressure operated movable drain valve means movable between other conduit means opening and closed portions and operably acted upon moved in opposite directions by fuel under pressure from opposite sides of said orifice for movement to its various positions.

2. A fuel control system as in claim 1, said engine having a compressor providing a source of compressor discharge air that varies in pressure as a function of the changes in inlet fluid ambient temperature and speed of said compressor, said governor means also including compressor discharge pressure responsive means operably acting on said first mentioned drain valve means urging said first drain valve means in an opening direction in response to increases in compressor discharge pressure to modulate the pressure of the fuel in the downstream line also as a function of changes in compressor discharge pressure.

3. A fuel control system as in claim 1, said engine having a compressor providing a source of compressor discharge air that varies in pressure as a function of the changes in inlet fluid ambient temperature and speed of said compressor, said control means also including compressor discharge pressure responsive movable means operably acting on said second drain valve means in a closing direction to modulate the flow in said discharge line downstream of said orifice as a function of the change in compressor discharge fluid pressure.

4. A fuel control system as in claim 3, said governor means also including, second compressor discharge pressure responsive means operably acting on said first mentioned drain valve means urging said latter drain valve means in an opening direction in response to increases in compressor discharge pressure to modulate the pressure of the fuel in the downstream line also as a function of changes in compressor discharge pressure.

5. A fuel control system as in claim 1, including additional conduit means connecting the fuel in said discharge line on opposite sides of said orifice, additional flow control means in said additional conduit means movable between the additional conduit means open and closed positions to control the flow therethrough, and temperature responsive means connected to and sensitive to an operating temperature of said engine engaging said additional fuel flow control means urging said latter control means toward one position with a force varying as a function of the changes in temperature of a portion of the engine.

6. A fuel control system as in claim 5, said engine having a compressor providing a source of compressor discharge air that varies in pressure as a function of the changes in inlet fluid ambient temperature and speed of said compressor, said governor means also including compressor discharge pressure responsive means operably acting on said first mentioned drain valve means urging said drain valve means in an opening direction in response to increases in compressure discharge pressure to modulate the pressure of the fuel in the downstream line also as a function of changes in compressor discharge pressure.

7. A fuel control system as in claim 6, including second compressor discharge pressure responsive movable means operably acting on said second drain valve means in a closing direction to modulate the flow in said discharge line downstream of said orifice as a function of the changes in compressor discharge fluid pressure.

8. A fuel control system for a gas turbine engine having a compressor providing a source of compressor discharge air that varies in pressure as a function of the changes in inlet fluid ambient temperature and speed of said compressor, comprising, an engine driven speed responsive fuel pump having a low pressure fuel inlet line and a high pressure fuel discharge line, the latter line containing a fuel varying in pressure as a function of the speed of said pump, a variable area flow restricting engine throttle valve in said discharge line variably movable between flow restricting and non-restricting positions for controlling the flow through said discharge line, governor means associated with said pump and lines for maintaining the pressure drop of the fuel flow across said throttle valve at predetermined levels varying as a function of the change in position of said throttle valve and the changes in said compressor discharge pressure, said governor means including conduit means connecting the portion of said discharge line downstream of said valve to said inlet lines, a spring closed differential pressure operated drain valve means in said conduit means movable between conduit means opening and closed positions and operably acted upon in opposite directions by fuel under pressure from portions of said discharge line on opposite sides of said throttle valve for movement to its various positions, compressor discharge fluid pressure responsive means operably acting on said drain valve means urging said drain valve means in an opening direction in response to increases in compressor discharge fluid pressure, said downstream portion of said discharge line containing a flow restricting orifice, control means associated with said orifice and lines for controlling the fuel pressure drop across said orifice, said control means including, other conduit means connecting said inlet line to the portion of said discharge line upstream of said orifice, a second spring closed differential pressure operated movable drain valve means movable between conduit means opening and closed positions and operably acted upon and moved in opposite directions by fuel under pressure from opposite sides of said orifice for movement to its various positions, second compressor discharge fluid pressure responsive movable means operably acting on said second drain valve means in a closing direction to modulate the flow in said discharge line portion downstream of said orifice as a function of the changes in compressor discharge fluid pressure, additional conduit means connecting the fuel in said discharge line on opposite sides of said orifice, additional flow control means in said additional conduit means movable between additional conduit means open and closed positions to control the flow therethrough, and temperature responsive means connected to and sensitive to an operating temperature of said engine engaging said additional fuel flow control means toward one position with a force varying as a function of the changes in temperature of a portion of the engine.

9. A fuel control system as in claim 8, each of said drain valve means having piston means secured thereto, spring means biasing each of said piston means to a valve closed position, and means connecting the fuel on opposite sides of said throttle valve and orifice respectively to opposite sides of the said piston means respectively associated with said throttle valve and orifice to urge each of said piston means in valve opening and closing directions in response to corresponding differentials between the fluid and spring forces acting thereon.

10. A fuel control system as in claim 9, each of said compressor discharge pressure responsive means comprising a pressure differentially movable means operably abuttable against one of said drain valve means and acted upon and movable in one direction by compressor discharge fluid under pressure connected to and acting thereagainst opposed by spring means and fluid connected thereto and acting thereagainst at the pressure of said inlet line.

References Cited
UNITED STATES PATENTS

| | | | |
|---|---|---|---|
| 2,841,957 | 7/1958 | Thorpe et al. | 60—39.28 |
| 2,989,849 | 6/1961 | Torell et al. | 60—39.28 |
| 3,074,472 | 1/1963 | Williams. | |
| 3,078,669 | 2/1963 | Williams | 60—39.28 |
| 3,173,468 | 3/1965 | McCombs | 60—39.28 XR |

JULIUS E. WEST, *Primary Examiner.*